US011622898B2

United States Patent
Cushman et al.

(10) Patent No.: US 11,622,898 B2
(45) Date of Patent: Apr. 11, 2023

(54) MULTIPURPOSE PERSON RELOCATION DEVICE

(71) Applicant: Liko Research & Development AB, Lulea (SE)

(72) Inventors: Jessica Cushman, Cato, NY (US); Christopher Yeckel, Batesville, IN (US)

(73) Assignee: Liko Research & Development AB, Lulea (SE)

(*) Notice: Subject to any disclaimer, the term of this patent is extended or adjusted under 35 U.S.C. 154(b) by 0 days.

(21) Appl. No.: 16/903,436

(22) Filed: Jun. 17, 2020

(65) Prior Publication Data

US 2020/0397635 A1 Dec. 24, 2020

Related U.S. Application Data

(60) Provisional application No. 62/862,884, filed on Jun. 18, 2019.

(51) Int. Cl.
*A61G 7/10* (2006.01)
*F16B 1/00* (2006.01)

(52) U.S. Cl.
CPC ......... *A61G 7/1051* (2013.01); *A61G 7/1059* (2013.01); *F16B 1/0071* (2013.01); *A61G 2205/20* (2013.01)

(58) Field of Classification Search
CPC ............... A61G 7/1051; A61G 7/1059; A61G 2200/34; A61G 2205/20
See application file for complete search history.

(56) References Cited

U.S. PATENT DOCUMENTS

| | | | | |
|---|---|---|---|---|
| 3,203,009 A | * | 8/1965 | Lundberg | A61G 7/1046 5/87.1 |
| 4,202,063 A | * | 5/1980 | Murray | A61G 7/1015 5/87.1 |
| 4,748,701 A | * | 6/1988 | Marlowe | A61G 7/1019 5/89.1 |
| 4,805,248 A | * | 2/1989 | Lunau | A61G 7/1015 5/83.1 |
| 5,038,425 A | * | 8/1991 | Merry | A61G 7/1015 5/83.1 |
| 5,615,426 A | * | 4/1997 | Hokett | A61G 7/1017 5/486 |
| 5,673,444 A | * | 10/1997 | Middendorf | A45F 3/24 5/120 |

(Continued)

FOREIGN PATENT DOCUMENTS

| | | | | |
|---|---|---|---|---|
| DK | 748619 A2 | * | 12/1996 | ........... A61G 7/1017 |
| GB | 789468 A | * | 1/1958 | ........... A61G 7/1051 |

(Continued)

*Primary Examiner* — Peter M. Cuomo
*Assistant Examiner* — Alexis Felix Lopez
(74) *Attorney, Agent, or Firm* — Dinsmore & Shohl LLP

(57) ABSTRACT

A person relocation device includes sheet which defines a person space for a person. The sheet includes a left lateral strap, a right lateral strap, a head end strap and a foot end strap. Each strap is attached to the sheet only at a perimeter thereof and does not extend into the person space. The straps are adapted to be connected to a hoist so that when all of the straps are so connected and tensioned by the weight of the person the sheet suspends the person in a seated posture.

14 Claims, 13 Drawing Sheets

(56) References Cited

U.S. PATENT DOCUMENTS

| | | | | |
|---|---|---|---|---|
| 5,839,137 A * | 11/1998 | Butler | ............... | A61G 1/01 |
| | | | | 5/627 |
| 9,693,919 B2 * | 7/2017 | Berman | ............... | A61G 7/1023 |
| 10,543,139 B2 * | 1/2020 | Bullock | ............... | A61G 1/048 |
| 10,772,778 B2 * | 9/2020 | Hahn | ............... | A61G 7/05715 |
| 2003/0192118 A1 * | 10/2003 | Carbonneau | ......... | A61G 7/1051 |
| | | | | 5/89.1 |
| 2008/0028516 A1 * | 2/2008 | Morishima | ......... | A61G 7/1051 |
| | | | | 5/89.1 |
| 2012/0210511 A1 * | 8/2012 | Davis | ............... | A61G 7/1051 |
| | | | | 5/81.1 R |
| 2014/0041114 A1 * | 2/2014 | Davis | ............... | A61G 7/1025 |
| | | | | 5/83.1 |
| 2018/0303690 A1 * | 10/2018 | Hahn | ............... | A61G 7/05715 |

FOREIGN PATENT DOCUMENTS

| | | | | | |
|---|---|---|---|---|---|
| GB | 867149 A | * | 5/1961 | ........... | A61G 7/1017 |
| GB | 2347135 A | * | 8/2000 | ........... | A61G 7/1051 |
| GB | 2440504 A | * | 2/2008 | ........... | A61G 7/1084 |

* cited by examiner

MULTIPURPOSE PERSON RELOCATION DEVICE

CROSS REFERENCE TO RELATED APPLICATION

The present specification claims the benefit of U.S. Provisional Application 62/862,884 entitled "Multipurpose Person Relocation Device" filed on Jun. 18, 2019, the contents of which are incorporated herein by reference in their entirety.

TECHNICAL FIELD

The subject matter described herein relates to person relocation devices useful in health care settings for assisting in the relocation of a person, and particularly to a multipurpose device adapted to serve as a repositioning sheet and a transport sling.

BACKGROUND

In hospitals and other health care settings, it is sometimes necessary to relocate a patient. One form of relocation involves repositioning the patient on the patient's bed. Such intra-bed repositioning is often carried out with the assistance of a repositioning sheet having a patient side, a mattress side, and handles arranged around the perimeter of the sheet. The mattress side is made of a relatively slippery material. The patient side is made of a less slippery material. A caregiver places the repositioning sheet under the patient with its slippery mattress side facing the mattress and its less slippery patient side facing the patient and in contact with the patient. The caregiver then uses the handles to pull the sheet across the mattress in a desired direction (e.g., left, right, headward, footward, or some combination thereof) thereby repositioning the patient. Once the patient is repositioned, the caregiver removes the sheet from underneath the patient.

In contrast to the repositioning sheet described above, some repositioning sheets are extended use sheets designed to be left under the patient for an extended period. An extended use repositioning sheet serves not only as a repositioning sheet but also as a conventional bed sheet. Its long-term use relieves the caregiver of the task of putting the sheet in place under the patient every time patient repositioning is necessary and removing the sheet after the repositioning is complete. Because the patient will rest on the sheet for an extended time, the sheet must be designed for long-term comfort and should not include features that could cause the sheet to exacerbate the patient's risk of developing pressure ulcers during extended confinement to the bed. Such features include discontinuities such as seams that interrupt the otherwise smooth and uniform surface of the sheet.

Another form of repositioning is transport of the patient off the bed, and usually to another location. Caregivers often use a sling and a mobile hoist or a ceiling mounted hoist to assist with such transport. The sling is typically made of a strong fabric and includes hoisting straps that are connectable to the hoist. The caregiver positions the sling underneath the patient while the patient is lying in bed and then connects the sling straps to the hoist. The caregiver then operates the hoist, which lifts the sling by its straps and therefore lifts the patient off the bed.

Some hoists are mobile hoists having wheels. If the hoist is a mobile hoist, the caregiver rolls the hoist to the desired patient destination (e.g., an x-ray table) then operates the hoist to lower the patient to the destination, disengages the sling from the hoist, and removes the sling from underneath the patient.

Other hoists are ceiling mounted hoists comprised of a lifting unit and a ceiling mounted track. Rollers on the lifting unit engage the track. Once the patient has been hoisted off the bed, the caregiver pulls the sling in order to move the lifting unit horizontally along the track and transport the patient to any destination within reach of the track. The caregiver then operates the hoist to lower the patient to the destination, disengages the sling from the hoist, and removes the sling from underneath the patient.

Slings of the type described above are not intended to support the patient for an extended period and therefore might not be designed with pressure ulcer prevention in mind, or might be designed with pressure ulcer prevention as a lower priority than would be the case for a repositioning sheet intended for long duration use. Indeed, the need to safely support all of the patient's weight may lead the designer to include features that contribute to sling strength, but are contraindicated for pressure ulcer prevention. Such design features may include hoisting straps that extend through the person space of the sling. The person space or patient space is the portion of the sling that the person occupying the sling is expected to be in contact with during transport. The patient space does not include a perimeter region that portions of the patient's body may cross, such as the patient's legs, arms, neck and head.

In addition, the sling may be designed so that the patient is in a supine posture during the transport, even though a seated posture may be more desirable either for medical reasons or to make the transport event more comfortable and/or less frightening for the patient. A seated transport posture may also be desirable, not because of the transport itself, but because the patient's pre-transport posture is a seated posture and/or his post-transport posture is intended to be a seated posture. Even if the sling is designed with seated transport in mind, the person space may be made of a material stiff enough to cause patient discomfort during hoisting and transport.

In addition, to the extent that existing slings have features which may allow a caregiver to customize the sling for different patients or transport requirements, the caregiver may not be well informed that the features are present or of how to use them.

Therefore there is a need for a person relocation device that can serve as an extended duration bed sheet, and can serve as a transport sling that is comfortable to the patient, permits patient transport in both supine and seated postures, and takes the guesswork out of how to achieve a desired customization.

SUMMARY

A person relocation device includes a sheet which defines a person space for a person. The sheet includes a left lateral strap, a right lateral strap, a head end strap and a foot end strap. Each strap is attached to the sheet only at a perimeter thereof and does not extend into the person space. The straps are adapted to be connected to a hoist so that when all of the straps are so connected and tensioned by the weight of the person the sheet suspends the person in a seated posture. Suspension of the person in a supine posture is also achievable.

BRIEF DESCRIPTION OF THE DRAWINGS

The foregoing and other features of the various embodiments of the person relocation device described herein will become more apparent from the following detailed description and the accompanying drawings in which.

DETAILED DESCRIPTION

Figure 1:
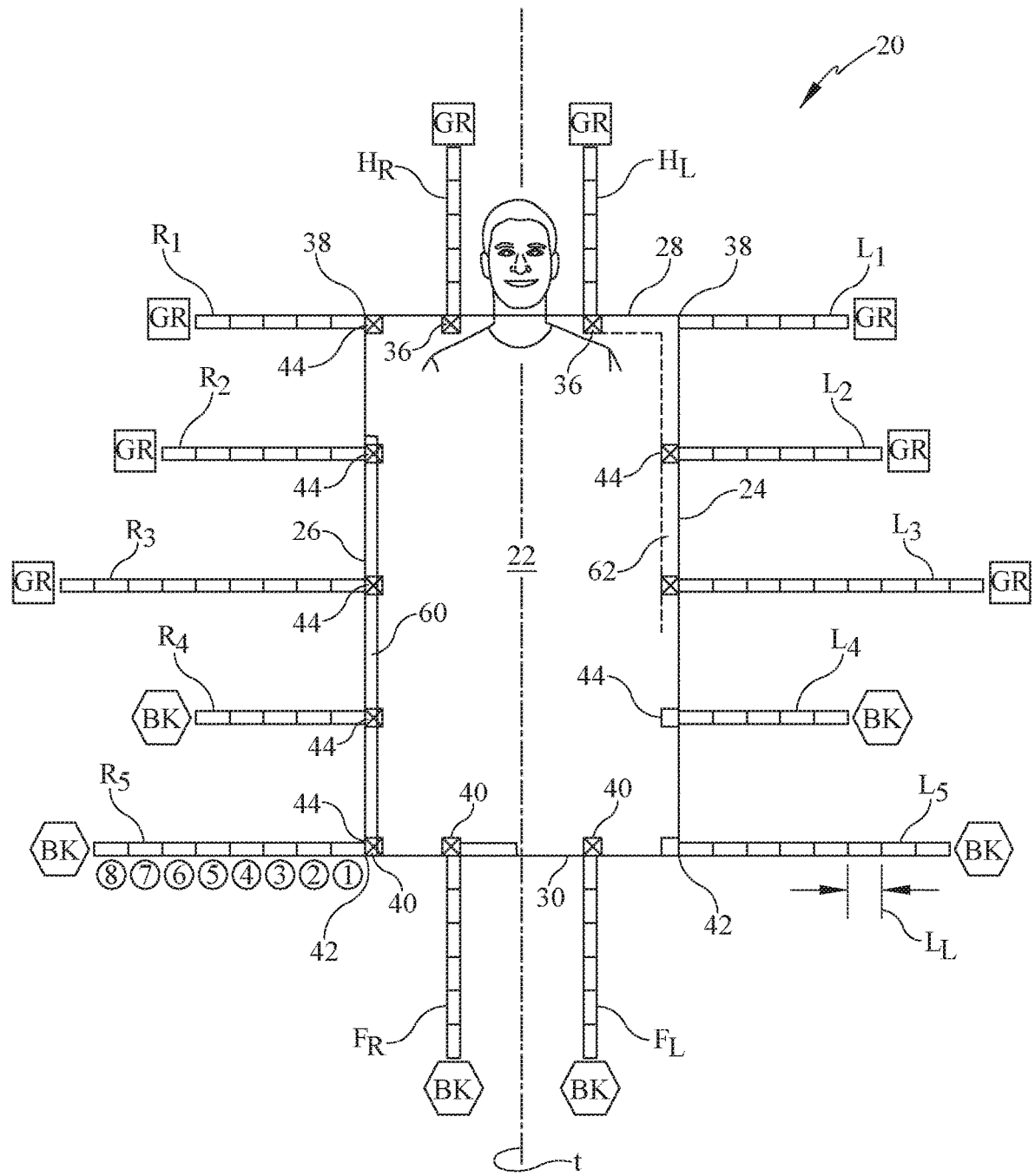
FIG. 1 is a plan view schematically illustrating an embodiment of the person relocation device described herein, showing the device in a flat, sheet-like (not connected to a hoist) and with a patient lying supine on the device, and also showing straps extending from the perimeter of the sheet.

In this specification and drawings, features similar to or the same as features already described may be identified by reference characters or numerals which are the same as or similar to those previously used. Similar elements may be identified by a common reference character or numeral, with suffixes being used to refer to specific occurrences of the element. Examples given in this application are prophetic examples. "Patient" and "person" are used interchangeably.

The embodiments described herein may comprise one or more of the features recited in the appended claims and/or one or more of the following features or combinations thereof.

Referring to FIGS. 1-7, a person relocation device 20 comprises a sheet 22 having a left lateral side or edge 24, a right lateral side or edge 26, a head end or edge 28, and a foot end or edge 30. FIG. 1 also shows a longitudinally extending centerline t. The lateral and longitudinal dimensions of the sheet are large in comparison to its thickness, and the sheet is not inflatable, as is the case with some devices used for patient relocation. The sheet also includes a left lateral strap, a right lateral strap, a head end strap and a foot end strap. The illustrated embodiment includes five left lateral straps L1 through L5, five right lateral straps R1 through R5, left and right head end straps HR, HL, and left and right foot end straps FL, FR. The straps are essentially non-elastic, i.e. they do not stretch by any meaningful amount when the device is used to suspend a patient from a hoist. The illustrated strap lengths are not necessarily representative of the lengths that would be suitable for a commercial product. For example, some of the shorter straps (L1, L2, L4 and their right side counterparts) would likely have to be longer to enable the patient to be transported in a supine posture. Left and right are from the perspective of a person lying face up on the sheet with the person's head closer to head end 28 and the person's feet closer to foot end 30 as seen in FIG. 1. In this specification, L, R, F and H designate the left, right, head, and foot straps collectively, i.e. when there is no need to refer to a specific left side, right side, head end or foot end strap.

Each head end strap HL, HR is attached to the sheet at a respective head end attachment point 36, which is laterally offset from a head end, corner 38 of the sheet. Each foot end strap FL, FR, is attached to the sheet at a respective foot end attachment point 40 that is laterally offset from a foot end corner 42 of the sheet. The head end and foot end attachment points, as well as attachment points 44 of straps L1 through L5 and R1 through R5 are also referred to herein as simply "attachments".

At least some of the straps comprise loops. In the embodiment of FIGS. 1-7 all the straps are comprised of loops. The loops illustrated in the accompanying drawings are all of the same loop length $L_L$ (labelled only in FIGS. 1 and 10) however, loops of differing lengths may be employed on different straps and/or intermixed on any given strap. The illustrated loop count for each strap is not necessarily representative of the loop count that that would be suitable for a commercial product—more or fewer loops could be provided. In the illustrations, the loops of any given strap are numbered beginning with the integer 1 assigned to the loop closest to sheet 22 and with the highest integer assigned to the loop furthest from the sheet. The closest and furthest loops may also be referred to as the proximal and distal loops, respectively. In the illustrations, the loop identification integers are circumscribed by a circle so that the reader can readily distinguish them from other reference numerals.

In FIG. 1, the loops of only strap R5 are numbered in order to preserve the clarity of the illustration. In other drawings, loop numbers are applied only as needed to avoid undue clutter on the drawings, however the numbering scheme is as already described in this paragraph. The notation S/L may be used in this specification to identify a specific loop L of a specific strap S. For example, R3/6 may be used to identify loop 6 of strap R3.

Figure 7:
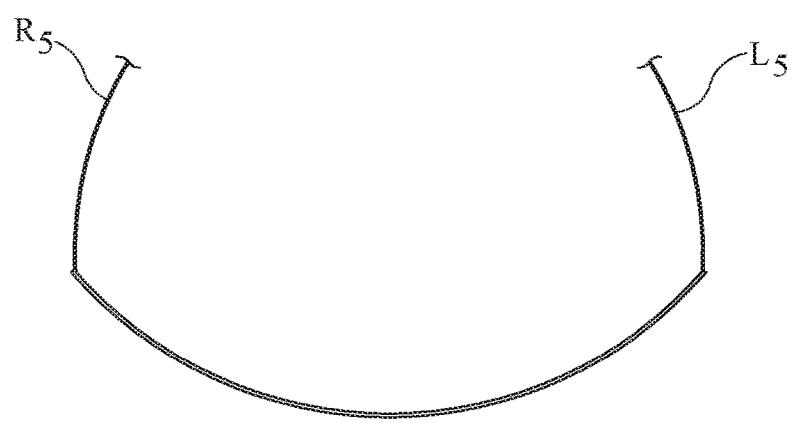
FIG. 7 is an end elevation view of FIG. 6.
Figure 8:
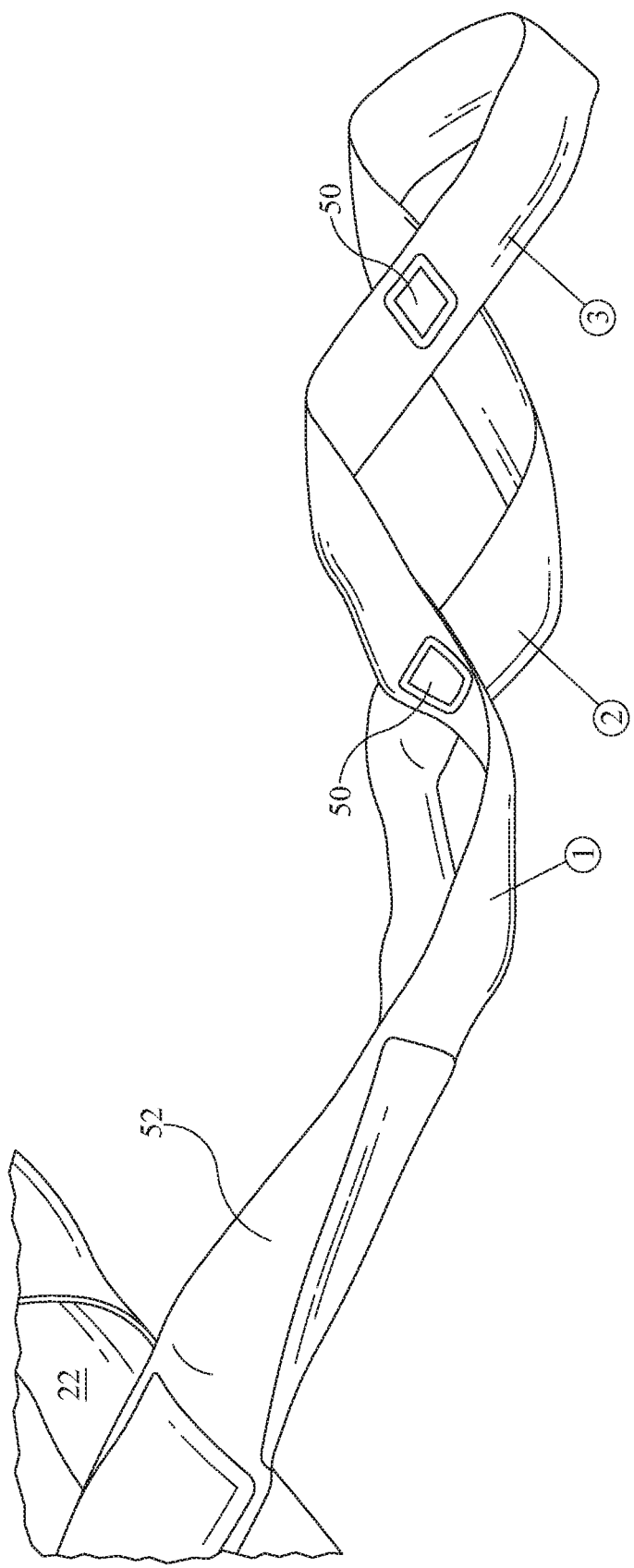
FIG. 8 is a view showing a more realistic rendering of a suitable strap and loop portions thereof.

FIG. 8 shows a more realistic rendering of a suitable strap and the loops thereof. The loops are formed from a larger loop of fabric that is twisted and attached to itself at junctures 50. The illustrated strap includes a non-looped base 52 that extends from loop 1 and is attached to sheet 22. Alternatively, as illustrated schematically in FIGS. 1-7, loop 1 could be attached directly to sheet 22 without an intervening base 52.

Referring specifically to FIG. 1 the sheet may include a reinforced band 60 at its perimeter. Reinforced band 60 is indicated by a solid line and is illustrated only partially (along the right edge from strap R5 to strap R2 and along the foot edge from right edge 26 to about midway between straps FR and FL). Additionally or alternatively attachment points 36, 40, 44 may be thought of as defining an attachment band 62. Attachment band 62 is indicated by a dashed line and, like the reinforced band 60, is shown only partially (along the left edge from strap L1 to strap L3 and along the head edge from left edge 24 to strap HL). The reinforced band 60 and attachment band 62 may be one and the same.

The sheet has an approximately rectangular planform, which includes the limit case of a square planform. A planform is considered to be rectangular even though it may exhibit some deviations from the concept of a perfect geometrical rectangle. These include, for example, rounded corners where the edges meet each other.

The sheet defines a person space for a person. The person space is the portion of the sling that the person occupying the sling is expected to be in contact with during transport. The person space does not include reinforced band 60 or attachment band 62 even though those bands may be crossed by portions of the patient's body, such as the patient's legs, arms, neck, and head. FIG. 1 shows an example of the patient's neck crossing an attachment band 62.

The straps are attached to sheet 22 only at the perimeter of the sheet so that the straps do not extend into the person space where their presence could create enough pressure on the patient's skin to elevate the risk of pressure ulcer development.

Figure 2:
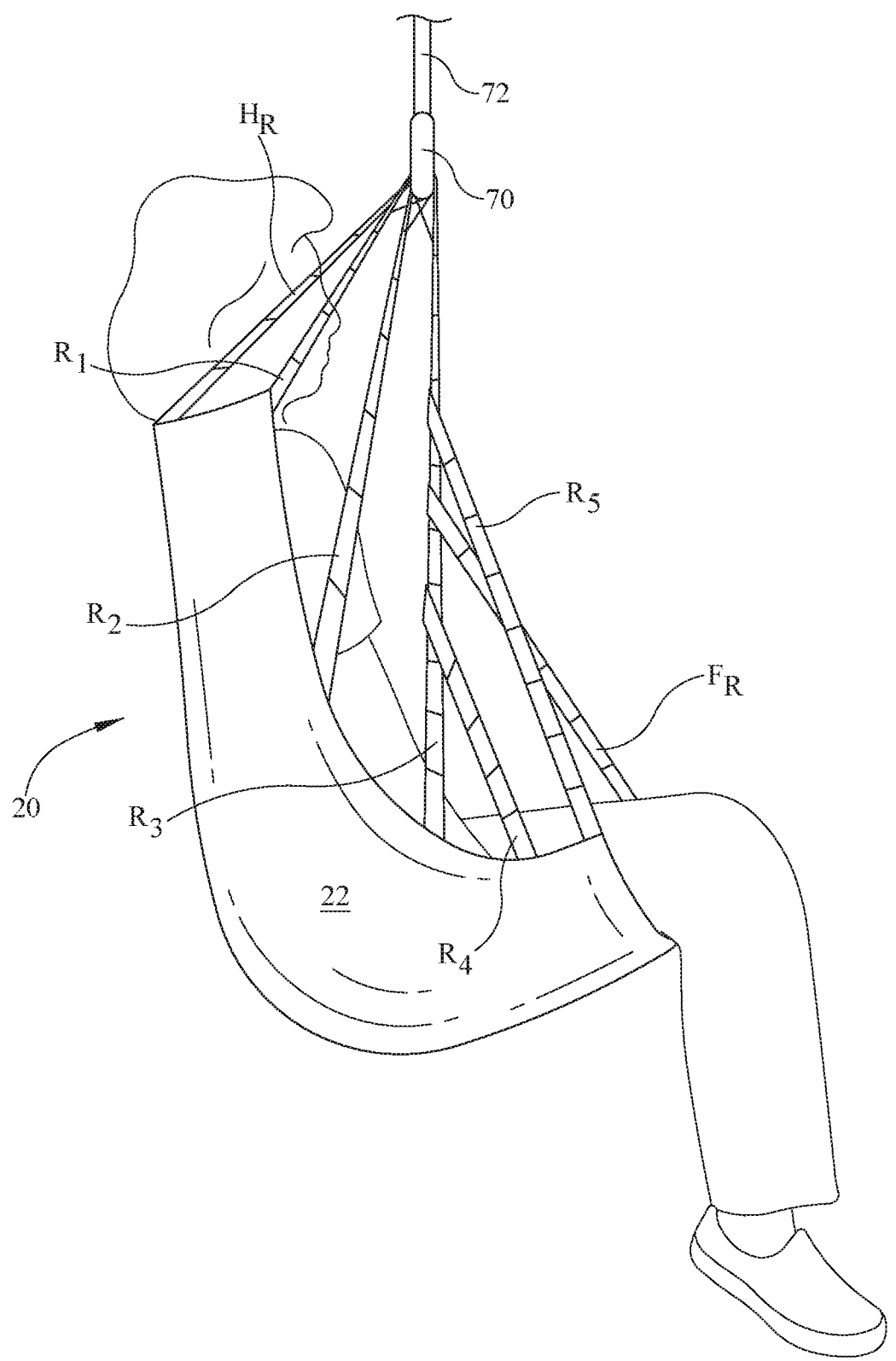
FIG. 2 is a side elevation view of the device of FIG. 1 showing the device connected to a slingbar component of a hoist and suspending a patient so that the device is in a sling-like configuration and the patient is in a seated posture.
Figure 3:
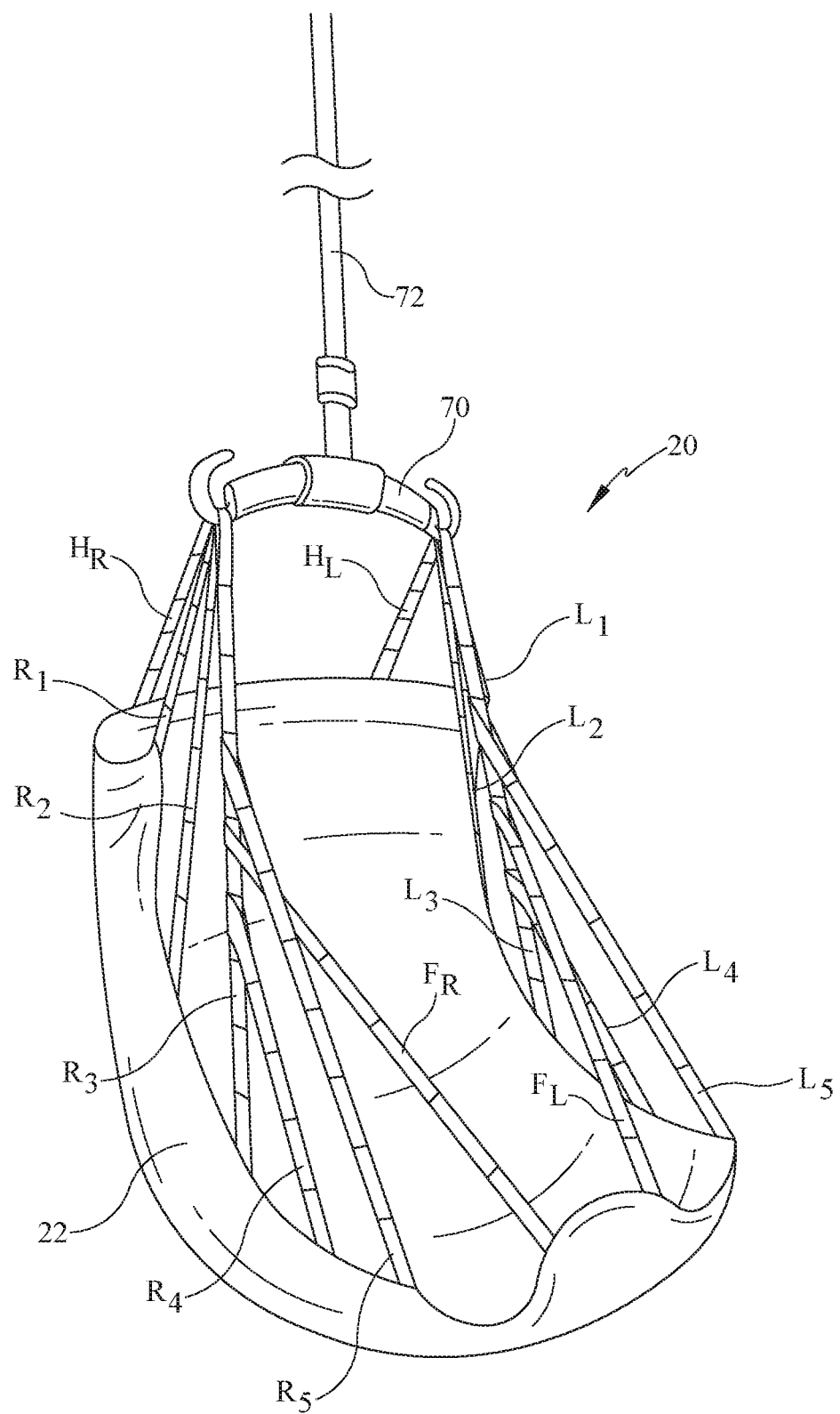
FIG. 3 is a perspective view of the device of FIGS. 1-2 showing the device in the sling-like configuration, as if it were occupied by a patient in a seated posture, but with the patient not illustrated in the interest of clearly showing the device itself.
Figure 4:
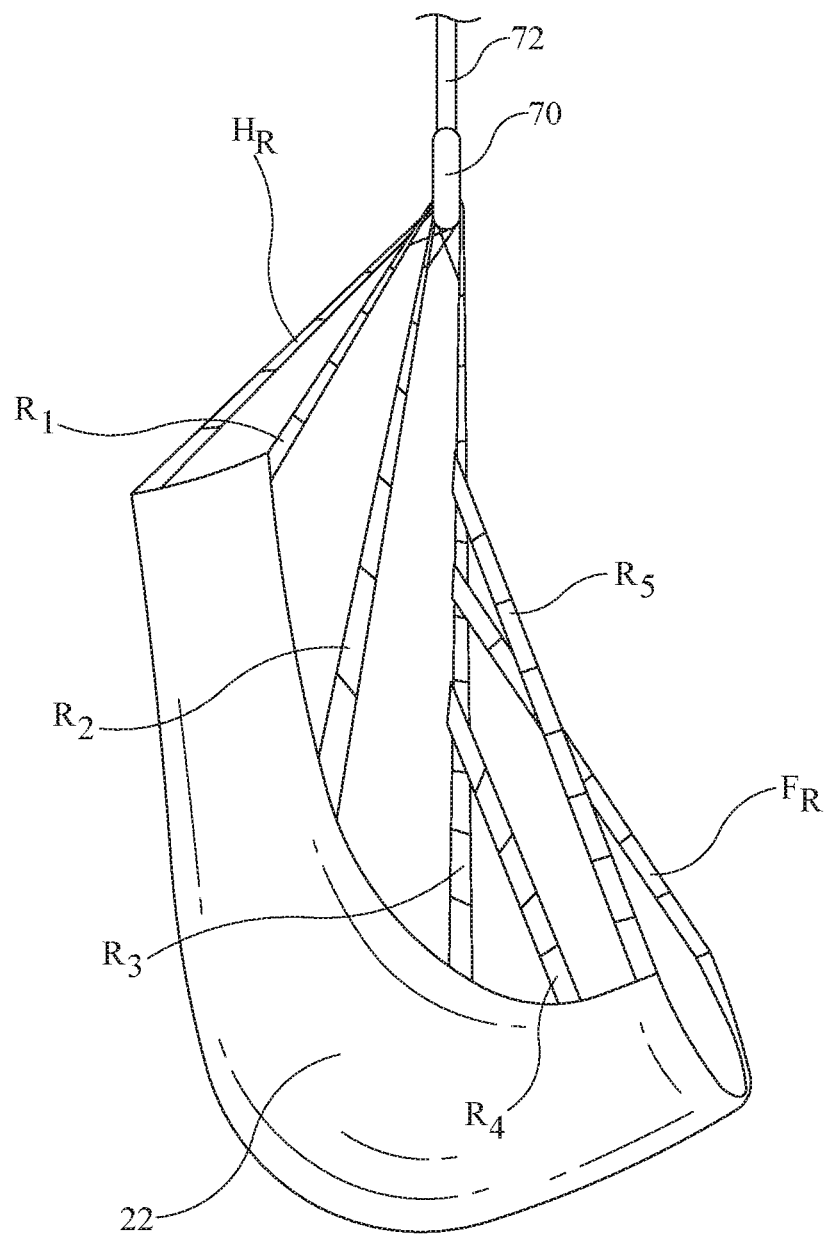
FIG. 4 is a side elevation view of the device of FIGS. 1-2 showing the device in the sling-like configuration, as if it were occupied by a patient in a seated posture, but with the patient not illustrated in the interest of clearly showing the device itself.
Figure 5:
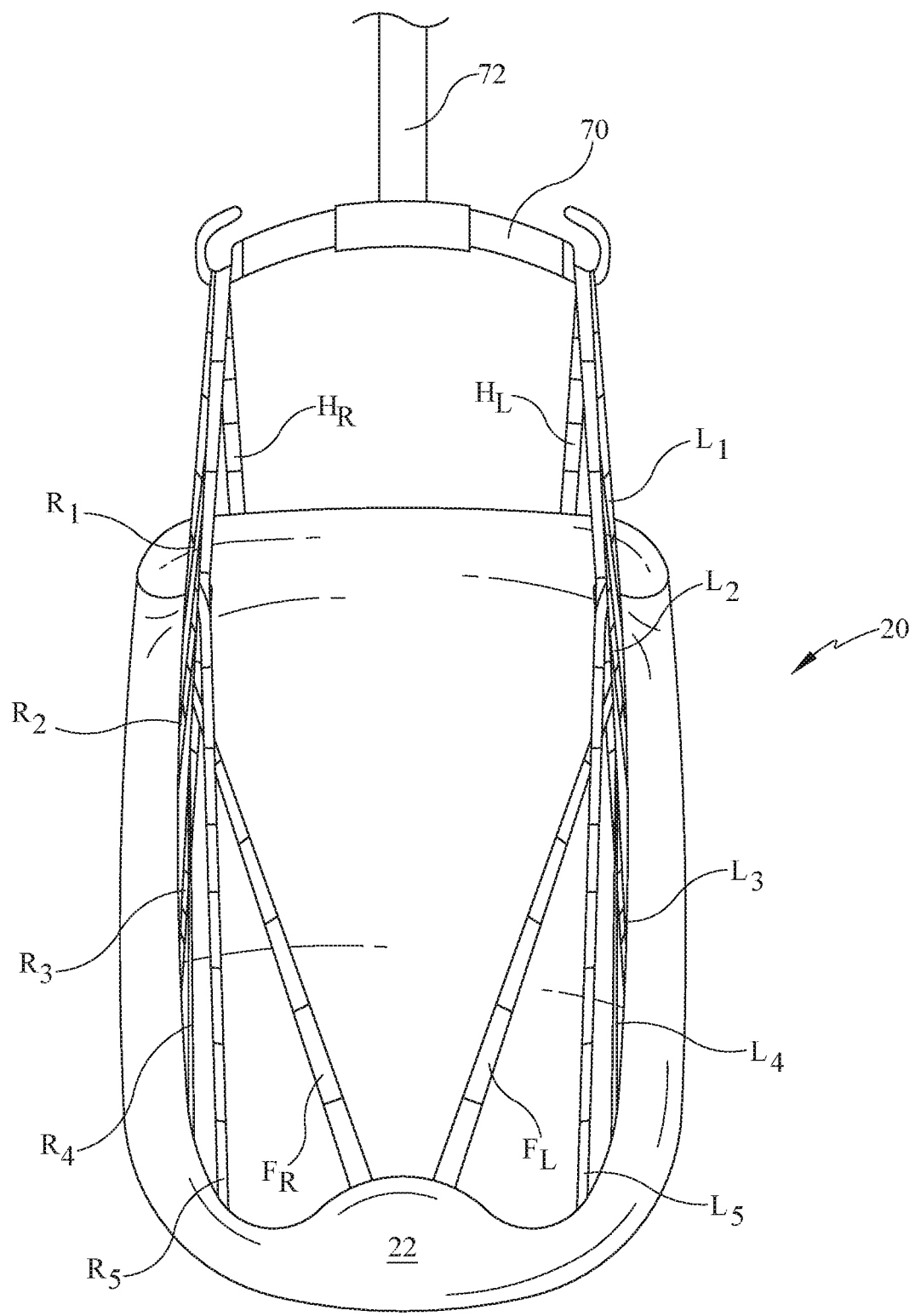
FIG. 5 is a front view of the device of FIGS. 1-2 showing the device in the sling-like configuration, as if it were occupied by a patient in a seated posture, but with the patient not illustrated in the interest of clearly showing the device itself.
Figure 6:
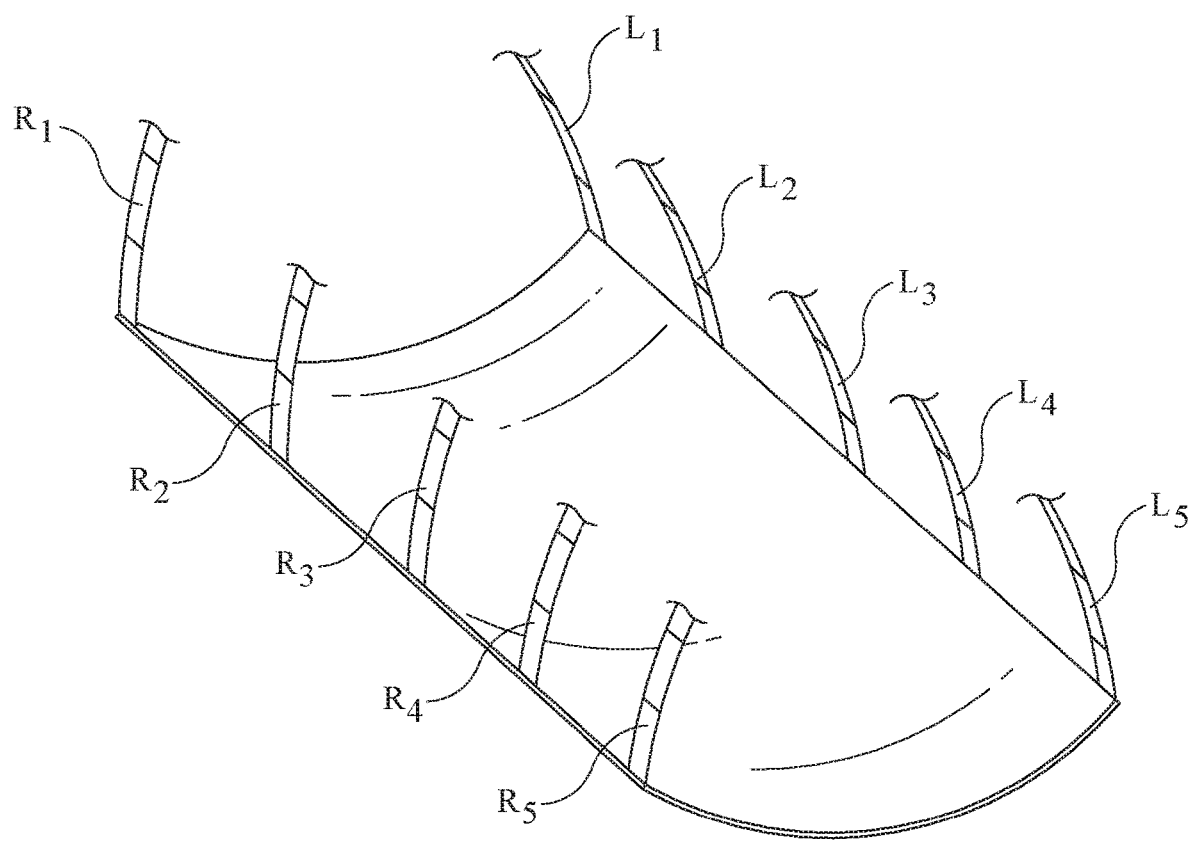
FIG. 6 is a perspective view showing the device in the sling-like configuration, as if it were occupied by a patient in a supine posture, but with the patient not illustrated in the interest of clearly showing the device itself.

FIGS. 2-5 show a slingbar 70 and a tether 72, both of which are components of a hoist. Straps L, R, H and F are adapted to be connected to the hoist (and are shown as connected to the hoist). Referring additionally to FIGS. 6-7, when all the straps are connected to the hoist and tensioned by the weight of the patient, sheet 22 suspends the person in a particular posture. The posture of FIGS. 2-5 is a seated posture; the posture of FIGS. 6-7 is a supine posture. In FIG. 2, the relocation device is shown with a patient suspended therein. The patient is not shown in FIGS. 3-7, however the sheet is illustrated as if it were bearing the patient's weight. In the hoisted, weight bearing state of FIGS. 2-7 the sheet takes on the form of a sling rather than a flat sheet and may be referred to as a sling.

Figure 9:
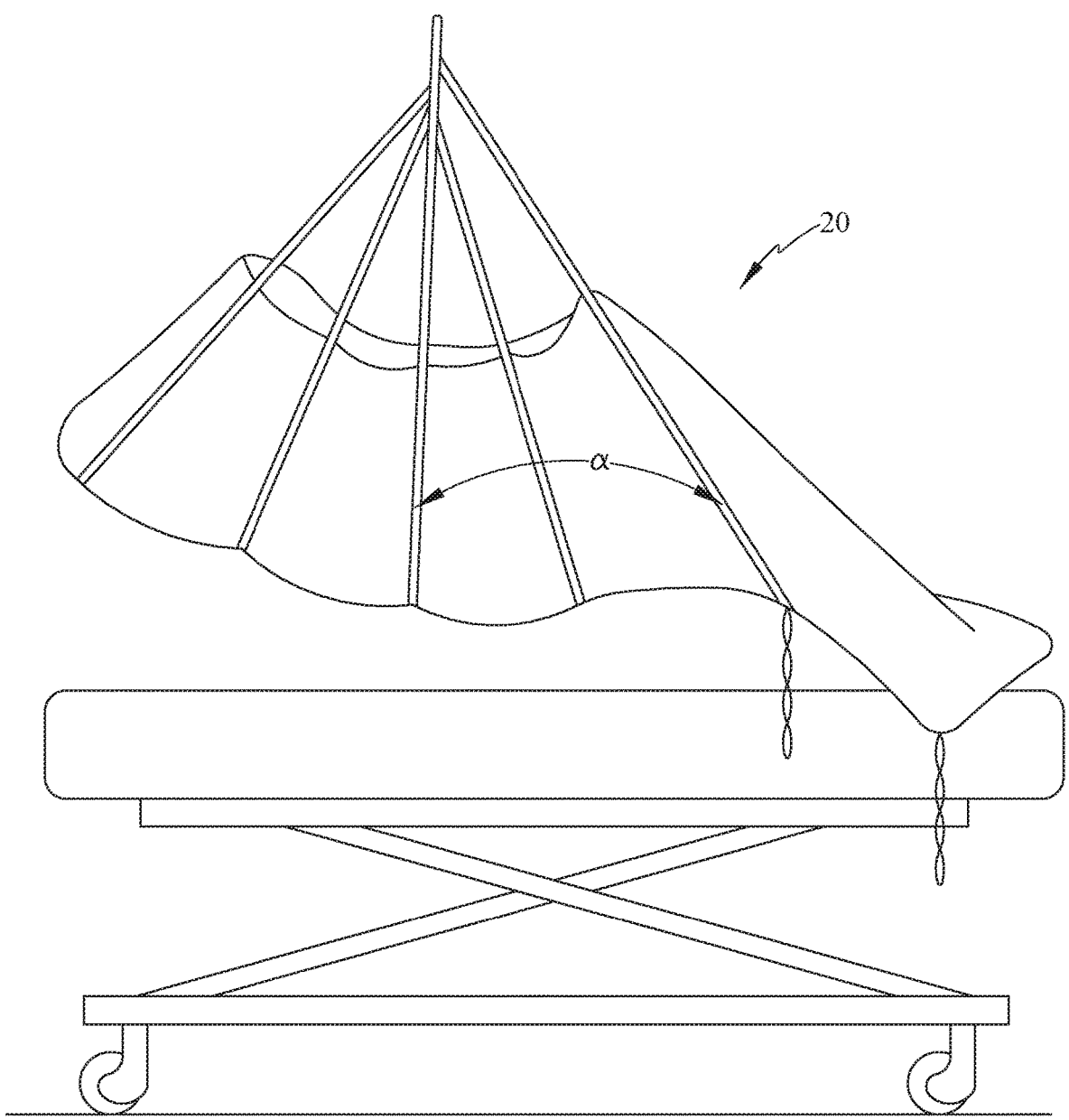
FIG. 9 is a view of a patient supported in a sling in a supine posture.
Figure 12A:
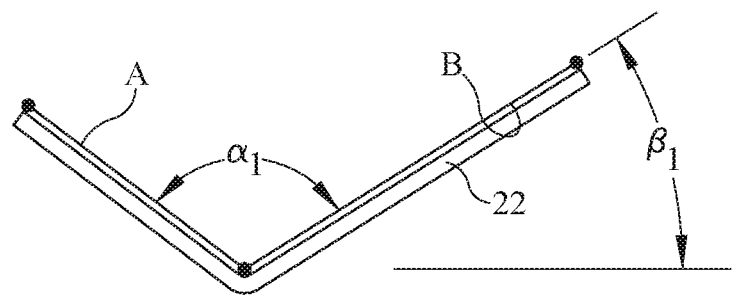
FIG. 12A is a schematic side elevation view schematically showing one of three different transport orientations of a patient (depicted schematically by line segment A (torso) and B (thighs) in a seated posture).
Figure 12B:
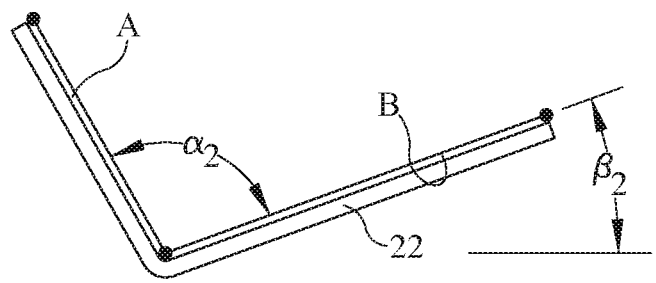
FIG. 12B is a schematic side elevation view schematically showing one of three different transport orientations of a patient (depicted schematically by line segment A (torso) and B (thighs) in a seated posture).
Figure 12C:
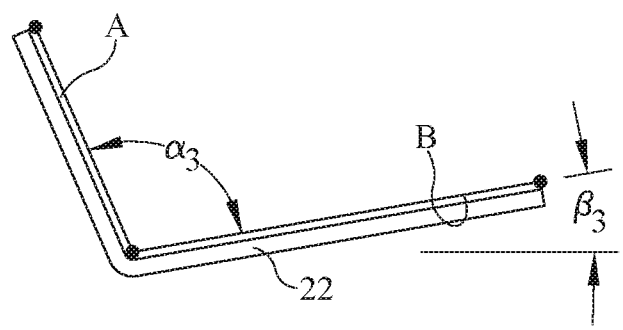
FIG. 12C is a schematic side elevation view schematically showing one of three different transport orientations of a patient (depicted schematically by line segment A (torso) and B (thighs) in a seated posture).

In connection with a person suspended in the sling, one definition of seated posture is the geometric definition that the person's legs are bent at the knees with the person's thighs supported by the sling but with the person's calves and feet either not supported by the sling or so insufficiently supported by the sling that they dangle freely toward the floor with the person's feet lower than the person's knees. By contrast, and referring to FIG. 9, a supine posture is one in which angle α (which is seen in FIGS. 12A-12C and may be referred to as "hip angle") is approximately 180 degrees, and at least part of the person's calves are supported by the sling. The support provided to the peron's calves in the supine posture does not necessarily mean that the person's calves will not be inclined toward the floor, however that inclination will be governed and constrained by the support provided by the sling so that the person's calves and feet do not dangle, as in the seated posture.

Alternatively, the definition of seated can be framed in terms of "transport posture". Transport posture relates to the destination the person is being transported to or the origin the person is being transported from. For example, ordinary practice is for a caregiver to ensure that a person being transported to or from a chair, wheelchair, toilet, or other device having a chair-like profile will be suspended in a posture that approximately mimics his posture when occupying the chair, wheelchair, toilet, etc. Therefore, the patient's suspended posture during such transport is considered to be a seated posture. The transport posture definition of "seated" may stand alone or may be used to further qualify or be further qualified by the geometric definition and/or its qualifications described above.

Figure 10:
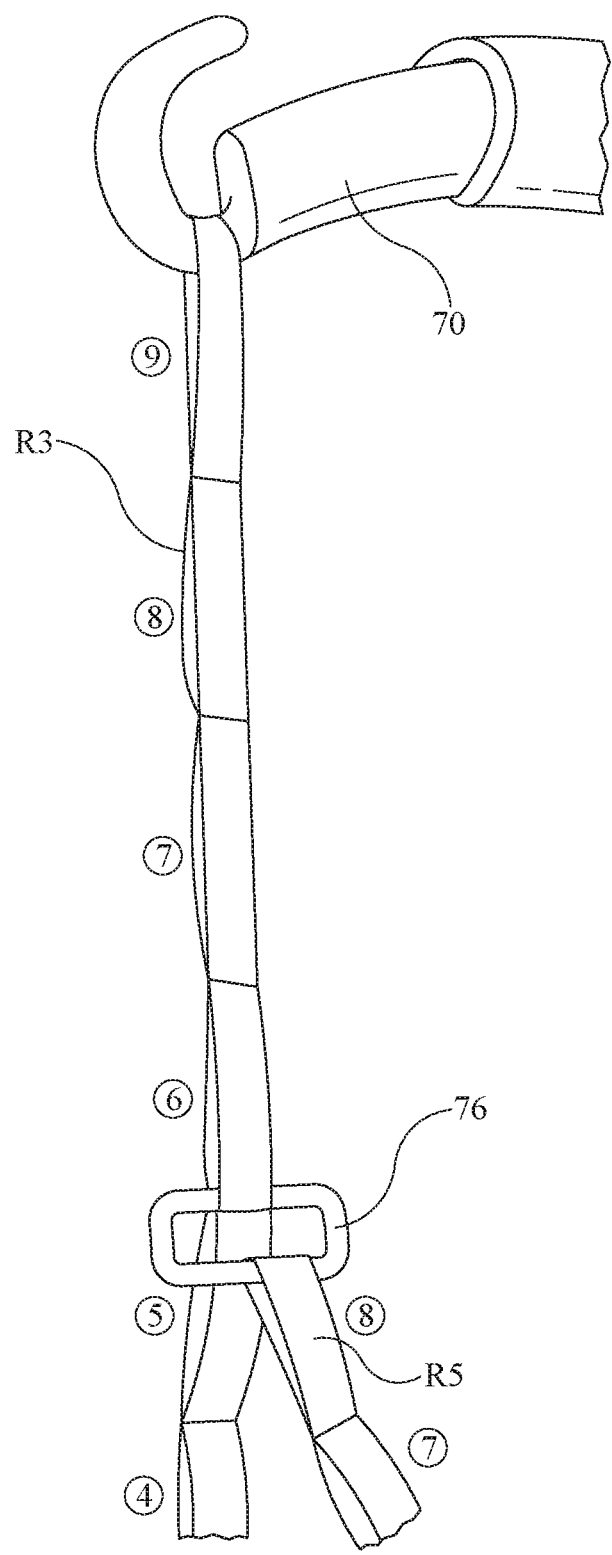
FIG. 10 is a magnified perspective view similar to that of FIG. 3 showing only selected straps on only the right side of the device, and showing one strap of a first set of straps directly connected to a hoist component and one strap of a second set of straps indirectly connected to the hoist component by way of the directly connected strap.
Figure 13:
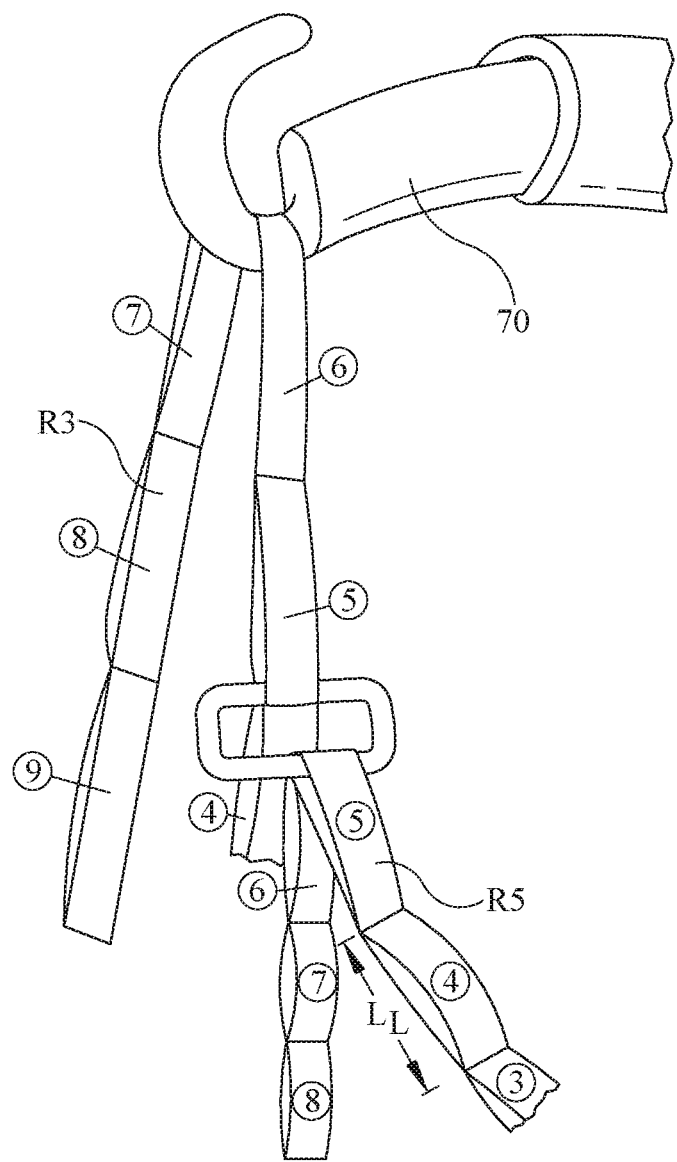
FIG. 13 is a view similar to FIG. 10 illustrating that the companion loop of an indirectly connected strap need not be the distal loop of that strap and that the loop of a directly connected strap which is attached to the hoist need not be the distal loop of that strap.

The embodiment of FIGS. 1-7 includes two classes or sets of straps. Straps of the first set are straps HL, HR, L1, L2, L3, R1, R2, R3. Straps of the second set are FL, FR, L4, L5, R4, R5. As probably seen best in FIG. 3, when all of the straps are connected to the hoist the straps of the first set are connected directly to the hoist and the straps of the second set are connected indirectly to the hoist by way of the straps of the first set. FIG. 10 shows an example in which loop 8 of strap R5 is connected to loop 6 of strap R3 by a ring 76, such as a metal ring. Although not visible in the drawing, an analogous connection is made on the right side of the device (L5/8 connected to L3/6). Ring 76 has a gate, not illustrated, which can be opened and closed to make or break the interloop connection. The interloop connections of the illustrations other than FIGS. 10 and 13 are shown schematically thereby emphasizing that the interloop connection can be made in any suitable way.

The first set of straps may be coded in a first way and the second set of straps may be coded in a second way that is distinguishable from the first way. The different ways of coding the straps may be used to indicate to a user which straps are intended to be connected directly to the hoist (e.g. to slingbar 70) and which are intended to be connected directly to other straps and therefore connected indirectly to the hoist. In one embodiment, the straps are color coded such that the straps of the first set are a first color and the straps of the second set are a second color. For example in FIG. 1 straps HR, R1, R2, R3 and their left side counterparts are labelled with "GR" enclosed in a square to signify that those straps are green, and straps R4, R5 and FR and their left side counterparts are labelled "BK" enclosed in a hexagon to signify that those straps are black. The green straps are intended to be connected to the hoist (e.g. to slingbar 70, which may be similarly coded as a reminder to the caregiver). The black straps are to be connected to the green straps. In other embodiments, the coding may take some other form, such as visually distinctive patterns, emblems, graphics, icons, lettering, or numbering, to name just a few possibilities.

Figure 11:
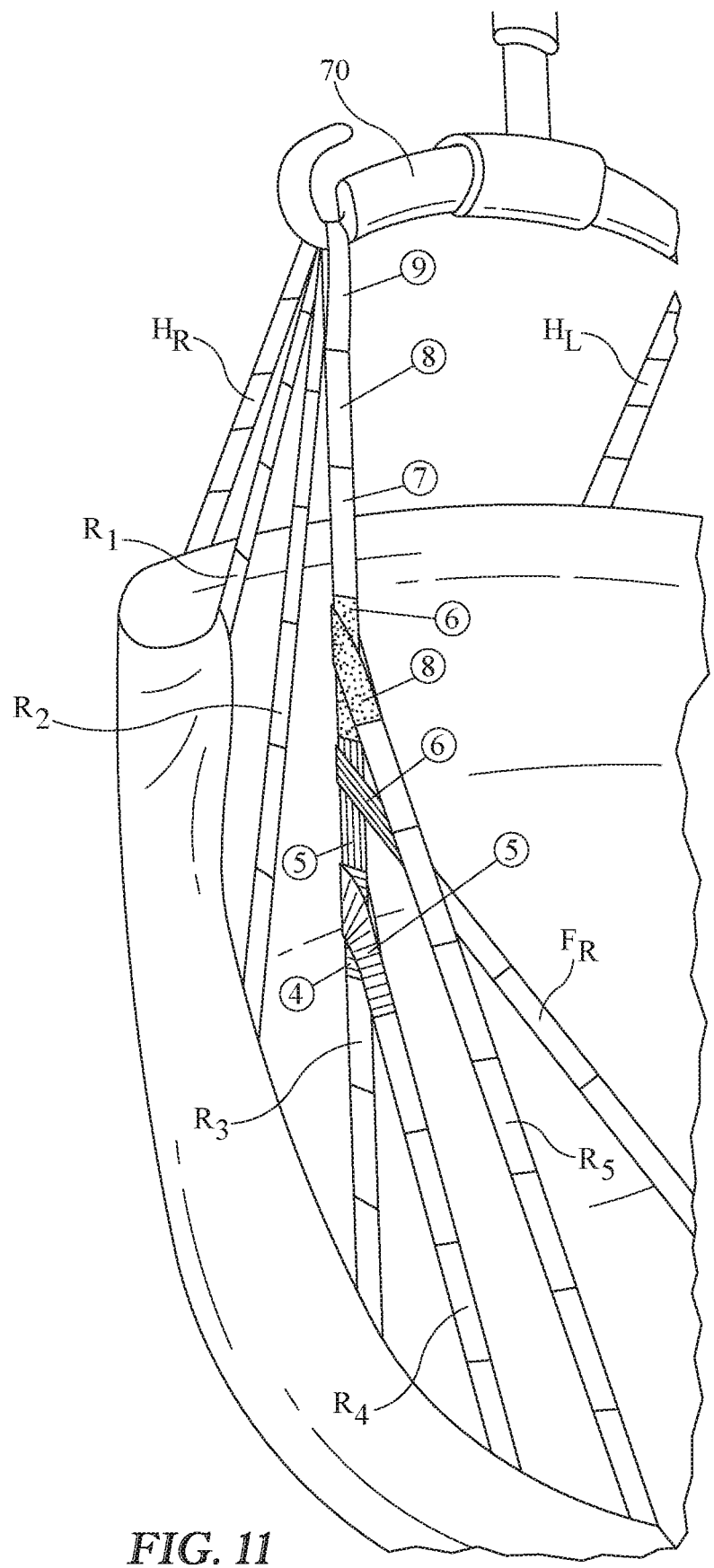
FIG. 11, is a view of the right side of the device of FIG. 3 showing coding applied to the individual loops of selected straps to indicate companion loops on different straps. Although not visible in the drawing, analogous coding is used on the left side of the device.

Additionally or alternatively, coding may be applied to the individual loops of a strap. In the example of FIG. 11, loop R5/8 and loop R3/6 are coded in a way that signifies a loop-to-loop match appropriate to a purpose. Such loops are referred to as companion loops. In FIGS. 11, R5/8 and R3/6 are both stippled to indicate the coding. In practice the coding applied to one companion member of a loop-to-loop match need not be the same as the other companion member of the loop-to-loop match as long as the coding is effective to indicate the match. As a further example, loops FR/6 and R3/5 are illustrated with lengthwise stripes to show that they are coded in a way to signify a loop-to-loop match. In yet another example loops R4/5 and R3/4 are illustrated with widthwise stripes to signify that they are companion loops. Although not visible in the drawing, analogous coding is used on the left side of the device.

The loop-to-loop matches may be customizable to serve different purposes. For example in one embodiment, selected loops are coded to signify a loop-to-loop match appropriate for a physical attribute of the person such as the person's weight and/or height. Table 1 below shows an example in which different loop-to-loop matches are appropriate for achieving a seated posture for patients of different weights. The loop-to-loop matches for the heavy weight patient of Table 1 are the same as those shown in FIG. 11. Although Table 1 shows only the loop-to-loop matches for the right side of the device, analogous matches apply to the left side of the device.

TABLE 1

| Companion 1 (Directly Connected) | | Patient Weight: <45 kg Companion 2 (Indirectly Connected) | | Patient Weight: 45-85 kg Companion 2 (Indirectly Connected) | | Patient Weight: >85 kg Companion 2 (Indirectly Connected) | |
|---|---|---|---|---|---|---|---|
| STRAP | LOOP | STRAP | LOOP | STRAP | LOOP | STRAP | LOOP |
| R3 | 4 | R4 | 3 | R4 | 4 | R4 | 5 |
| R3 | 5 | FR | 4 | FR | 5 | FR | 6 |
| R3 | 6 | R5 | 6 | R5 | 7 | R5 | 8 |

In the foregoing example loop R3/4 is the companion loop for R4/3, R4/4 and R4/5, depending on patient weight. Loop R3/5 is the companion for FR/4, FR/5, and FR/6 depending on patient weight. Loop R3/6 is the companion for R5/6, R5/7, and R5/8 depending on patient weight. In other words, irrespective of patient weight, the same three loops of directly connected strap R3 are companions to a suitable loop (which depends on patient weight) of strap R4, FR and R5. However, the use of the same loops of the directly connected strap as companions for the loops of the indirectly connected straps is not a limitation of the subject matter disclosed and claimed herein. On the contrary, any loop-to-loop match that satisfies the intended purpose may be used.

In another embodiment, selected loops are coded to signify a loop-to-loop match appropriate for achieving a particular gradation of the patient's posture. One example of posture gradation is a four way gradation: a first posture in which the patient's torso is at about a 90 degree angle relative to his thighs, a second posture in which his torso is at about a 105 degree angle relative to his thighs (approximately as seen in FIG. 2), a third posture in which his torso is at about a 120 degree angle relative to his thighs, and a fourth posture in which the patient is supine, i.e. face up with his torso and thighs forming an angle of approximately 180 degrees.

In another embodiment, selected loops are coded to signify a loop-to-loop match appropriate for achieving a desired transport orientation of the patient for any given posture. FIGS. 12A-12C schematically show three different orientations of a patient (depicted schematically by line segments A (torso) and B (thighs) in a seated posture). In all three illustrations the angle α defined by the patient's torso and thighs is approximately the same ($\alpha 1 = \alpha 2 = \alpha 3$). However the orientation of the patient, as indicated by the orientation of the patient's thighs relative to horizontal, differs among the three illustrations ($\beta 1 > \beta 2 > \beta 3$). Although the foregoing example is that of different orientations for a patient in a seated transport posture, loops can be coded to achieve different orientations for a patient in a supine transport posture.

The preceding paragraphs describe coding to indicate loop-to-loop matches for physical attributes of the patient, for achieving a desired gradation of the seated posture, and for achieving a desire transport orientation. Coding can be used for other purposes as well. Use of coding schemes for different purposes is not mutually exclusive. Instead, coding schemes for two or more different purposes can be applied to the device if desired.

When the straps are connected to the hoist as set forth in the left column of the table below, the sheet can achieve suspension of the person in a posture as set forth in the right column of Table 2:

TABLE 2

| Straps connected to the hoist and tensioned | Achievable Transport Posture |
|---|---|
| All straps | Seated |
| Fewer than all straps | Seated or Supine |
| At least a subset of the left lateral strap(s) and at least a subset of the right lateral strap(s) | Supine |

The straps are adapted to be connected to a hoist so that when a first selection of the straps are connected to the hoist (directly or indirectly) and tensioned by the weight of the person the sheet suspends the person in a seated posture, and when a second selection of the straps are connected to the hoist (directly or indirectly) and tensioned by the weight of the person the sheet suspends the person in a supine posture. For example, the selection of straps L1 through L5 and R1 through R5, or a subset thereof, may be suitable for suspending the patient in a supine posture. The selection of some or all of straps H and F and some or all of straps L and R may be suitable for suspending the patient in a seated posture. As is evident from the foregoing example the first and second selections may have certain straps in common, however strap commonality is not necessarily required.

As is evident from Table 1 the companion loop of an indirectly connected strap need not be the distal loop of that strap. Similarly, the loop of a directly connected strap that is attached to the slingbar 70 need not be the distal loop of that strap. This is illustrated in the example of FIG. 10 in which loop 6 of strap R3 rather than distal loop 9 is attached to the slingbar, and loop 5 of strap R5, rather than distal loop 8, is attached to strap R3. In effect, each strap has an actual or maximum length equal to the cumulative lengths $L_L$, of its loops (and any strap base 52 (FIG. 8)). Each strap also has an effective length which is selectable by the caregiver. For example, in FIG. 13 the effective length of strap R3 is the cumulative length of loops R3/1 through R3/6, and the effective length of strap R5 is the cumulative length of loops R5/1 through R5/5. The selectable effective lengths adapt the straps to be connected to the hoist (directly or indirectly depending on the strap under consideration) to achieve the seated posture. The selection of which loop to connect directly to the hoist, and the selection of companion loops, assists the caregiver in carrying out customization to accommodate, for example, the patient's physical attributes, gradation of the patient's seated posture, or transport orientation.

Figure 14:
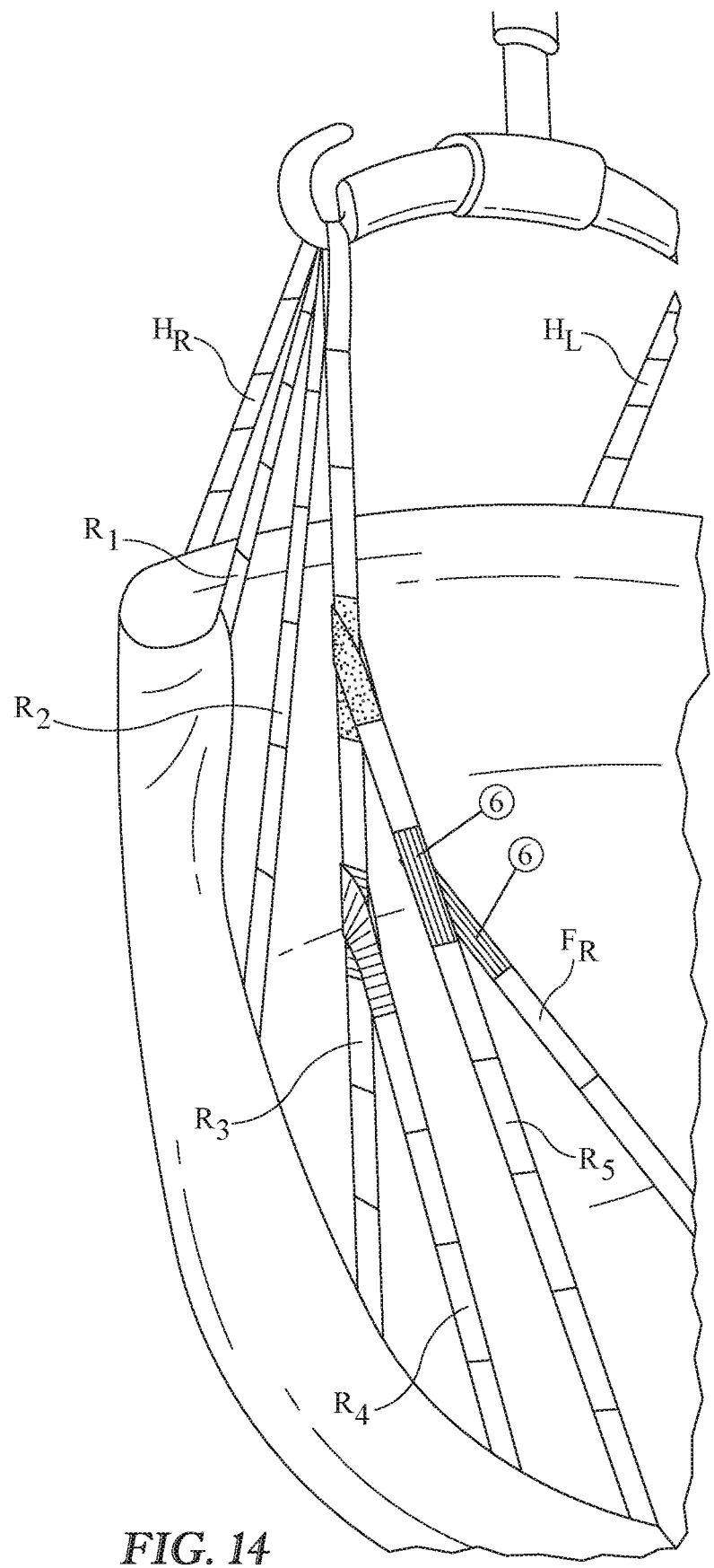
FIG. 14 is a view similar to FIG. 11 in which an indirectly connected strap is connected to another indirectly connected strap rather than to a directly connected strap.

FIG. 14 is a view similar to FIG. 11 showing that an indirectly connected strap may be connected to another indirectly connected strap rather than to a directly connected strap. Specifically, FR/6 is connected to R5/6 whereas in FIG. 11 FR/6 is connected to R3/5.

The material from which sheet 22 is made, and therefore the sheet itself, is laterally and longitudinally stretchable. As a result, the sheet can conform to the morphology of individual patients. This is in contrast to typical slings, which are made of materials that are stiff to the point of being essentially non-deformable in the lateral and longitudinal directions even when suspending a bariatric patient. Because of this non-deformability, accommodating different patient morphologies may require a medical facility to stockpile a wide selection of sling sizes. In addition, the sling manufacturer may attempt to accommodate different morphologies by manufacturing different classes of slings, each class intended to be used with patients who fit a particular morphological profile, for example tall and thin, or short and stocky. Each class of slings is made of panels whose shapes and/or dimensions are designed for the morphological profile the sling class is intended to accommodate. However, manufacturing slings in this way may require interpanel stitching that crosses through the patient space, thereby causing the sling to be a potential contributor to the patient's risk of developing pressure ulcers rather than a mitigator of such risk. The stretchability of the sheet described herein accommodates various patient morphologies without introducing additional risk of pressure ulcer development, and without requiring the stockpiling of numerous sizes of slings.

In one embodiment the material from which the sheet is made, and therefore the sheet itself, is breathable and washable. In another embodiment, the sheet is disposable.

Although this disclosure refers to specific embodiments, it will be understood by those skilled in the art that various changes in form and detail may be made without departing from the subject matter set forth in the accompanying claims.

We claim:

1. A person relocation device comprising:
a sheet which defines a person space for a person, the sheet including:
straps comprising at least one left lateral strap, at least one right lateral strap, at least one head end strap, and at least one foot end strap adjacent the at least one right lateral strap;
each strap attached to the sheet only at a perimeter thereof and not extending into the person space, the straps adapted to be connected to a hoist so that when all of the straps are so connected and tensioned by a weight of the person the sheet suspends the person in a seated posture,
wherein the straps include a first set of straps connectable directly to the hoist, the at least one right lateral strap and the at least one foot end strap each coupled to the first set of straps via a ring such that the at least one right lateral strap and the at least one foot end strap are selectively connected indirectly to the hoist by way of the straps of the first set of straps.

2. The person relocation device of claim 1 wherein the first set of straps is coded in a first way and a second set of straps, comprising the at least one right lateral strap and at least one foot end strap, is coded in a second way distinguishable from the first way.

3. The person relocation device of claim 2 wherein the coding is color coding.

4. The person relocation device of claim 2 wherein the first way of coding signifies that the straps of the first set of straps are to be connected directly to the hoist, and the second way of coding signifies that the straps of the second set of straps are to be connected indirectly to the hoist by way of a strap of the first set of straps.

5. The person relocation device of claim 1 wherein at least some straps are comprised of loops, and wherein selected loops are coded to signify a loop-to-loop match appropriate to a purpose.

6. The person relocation device of claim 5 wherein selected loops are coded to signify a loop-to-loop match appropriate for a physical attribute of the person.

7. The person relocation device of claim 5 wherein selected loops are coded to signify a loop-to-loop match appropriate for achieving a particular transport orientation.

8. The person relocation device of claim 1 wherein each strap has an actual length and a selectable effective length, and wherein the selectable effective length adapts the straps to be connected to the hoist in order to achieve the seated posture.

9. The person relocation device of claim 1 wherein the sheet has an approximately rectangular planform.

10. The person relocation device of claim 1 wherein the sheet is stretchable.

11. The person relocation device of claim 1 wherein each head end strap is attached to the sheet at a respective head end attachment point which is laterally offset from a head end corner of the sheet, and each foot end strap is attached to the sheet at a respective foot end attachment point which is laterally offset from a foot end corner of the sheet.

12. The person relocation device of claim 1, wherein the first set of straps and the at least one right lateral strap each comprise loops, wherein the at least one right lateral strap is selectively connected to the loops of the first set of straps, wherein the at least one foot end strap is selectively connected to the loops of the at least one right lateral strap.

13. A person relocation device comprising:
a sheet which defines a person space for a person, the sheet including:
straps comprising at least one left lateral strap, at least one right lateral strap, at least one head end strap, and at least one foot end strap;
each strap attached to the sheet only at a perimeter thereof and not extending into the person space, the straps adapted to be connected to a hoist so that when all of the straps are so connected and tensioned by a weight of the person, the sheet suspends the person in a seated posture, wherein the straps include a first set of straps and a second set of straps, and when all of the straps are connected to the hoist, the straps of the first set of straps are connected directly to the hoist and the straps of the second set of straps are selectively connected indirectly to the hoist by way of the straps of the first set of straps, wherein at least some straps are comprised of loops, and wherein selected loops are coded to signify a loop-to-loop match appropriate for achieving a particular gradation of the seated posture.

14. A person relocation device comprising:

a sheet which defines a person space for a person, the sheet including:

straps comprising at least one left lateral strap, at least one right lateral strap, at least one head end strap and at least one foot end strap; each strap attached to the sheet only at a perimeter thereof and not extending into the person space, wherein the straps include a first selection of straps and a second selection of straps and when all of the straps are connected to a hoist, the straps of the first selection of straps are connected directly to the hoist and the straps of the second selection of straps are connected indirectly to the hoist by way of the straps of the first selection of straps, wherein each strap of the second selection of straps is selectively repositionable between a plurality of connection points located on the first selection of straps, the plurality of connection points including:

supine connection points, wherein the sheet suspends the person in a supine posture when the straps of the second selection of straps are positioned at the supine connection points; and, seated connection points, wherein the sheet suspends the person in a seated posture when the straps of the second selection of straps are positioned at the seated connection points, wherein the seated connection points are positioned beneath the supine connection points such that selecting between the supine connection points and the seated connection points is operable to move the person between the seated posture and the supine posture.

* * * * *